United States Patent [19]

Strecker

[11] 3,876,723

[45] Apr. 8, 1975

[54] PROCESS OF CURING POLYDIENES WITH POLYEPOXIDES AND POLYTHIOLS

[75] Inventor: Ruediger A. H. Strecker, Waldkraiburg, Germany

[73] Assignee: The United States of America as represented by the Secretary of the Navy, Washington, D.C.

[22] Filed: Jan. 21, 1974

[21] Appl. No.: 435,072

[52] U.S. Cl. .......... 260/837 R; 260/830 S; 260/836
[51] Int. Cl. ..................... C08g 45/04; C08g 45/00
[58] Field of Search ................ 260/836, 837, 830 S

[56] References Cited
UNITED STATES PATENTS

| | | | |
|---|---|---|---|
| 3,338,810 | 8/1967 | Warner | 204/159.18 |
| 3,487,052 | 12/1969 | Millen | 260/79 |
| 3,499,864 | 3/1970 | Millen | 260/830 S |
| 3,529,036 | 9/1970 | Edwards | 260/837 |
| 3,676,283 | 7/1972 | Kehr | 260/837 |

*Primary Examiner*—Paul Lieberman
*Attorney, Agent, or Firm*—R. S. Sciascia; J. A. Cooke

[57] ABSTRACT

Polydienes are cured in either a one or two step process using polythiols with a peroxide catalyst and a polyepoxide with an amine catalyst.

14 Claims, No Drawings

PROCESS OF CURING POLYDIENES WITH POLYEPOXIDES AND POLYTHIOLS

BACKGROUND OF THE INVENTION

This invention relates to a process of curing a polymer and more particularly to a process of curing polydienes.

Polydienes can be cured in the same manner as the high molecular weight solid rubbers using methods such as peroxide vulcanization, and sulfur and accelerated sulfur vulcanization. However, these standard curing methods do not produce polydiene resins suitable for casting or extruding. The low molecular weight liquid polydienes cured in this fashion are particularly not suitable for casting or extruding. Furthermore, the curing or vulcanization by the conventional method are usually carried out at temperatures between 140° and 180°C. Such high curing temperatures are clearly not suitable for the making of propellant compositions.

It is known in the art that polydienes can be cured with polythiols and peroxides at temperatures below 100°C. But while this process leads to suitable mechanical properties for the polydienes being treated for some purposes, it is desirable to further improve on the mechanical properties of the polydienes, and also expand the uses of the polydienes.

SUMMARY OF THE INVENTION

It is therefore an object of this invention to provide a method for producing polydiene resins suitable for casting or extruding.

It is also an object of this invention to provide a method for curing polydiene resins at temperatures low enough so that the polydienes can be used to make propellants.

It is a further object of this invention to provide polydiene resins which have improved mechanical and physical properties and which can be cured at low temperatures.

These and other objects are attained by curing a polydiene resin with a polythiol and a peroxide catalyst together with a polyepoxide and an amine catalyst.

DESCRIPTION OF THE PREFERRED EMBODIMENTS

A combination of curing agents and catalysts cures the polydiene at a suitable low temperature of up to 100°C and the polydiene, polythiol, peroxide, polyepoxide and amine give the desired results. Polythiol serves as a curing agent with the peroxide serving as the catalyst. The polyepoxide is also a curing agent with the amine serving as a catalyst.

Curing can either be a one step or a two-step reaction. In the one step operation the polydiene, polythiol, peroxide, polyepoxide and amine are mixed and heated. In the two step operation, the polydiene, polythiol and peroxide are mixed and heated. Subsequently, the polyepoxide and the amine are added. Then another heating step takes place. With either curing method the mechanical properties including the casting and molding properties are improved.

The polydiene can be of many kinds. The monomer, which makes up the polydiene, may have from 4 to 6 carbon atoms. The polymer must have at least one carbon-to-carbon double bond which is unsaturated. Other substituents in the polymer may be present as long as the double bond in the polymer is not affected. Such substituents include the halogens and other common hydrocarbon substituents. A suitable molecular weight of the polymer ranges from 1000 to 100,000. This weight range includes both solid and liquid polymers. Liquid polymers particularly suitable for the purpose of this invention are the liquid polydienes having a molecular weight in the range 1,000 to 10,000. Particularly suitable for this invention is a liquid polymer of butadiene having a molecular weight in the range 1,000 to 10,000.

In addition to the various substituents which can be on the diene, the diene can also be polymerized with other unsaturated monomers. A brief non-limiting list of suitable unsaturated monomers includes styrene, acrylates, and acrylonitrile. Appropriate acrylates by way of example only are ethyl methacrylate, and methyl methacrylate. The monomers can be present in any amount basis so long as an adequate number of double bonds are present in polymer to carry out the curing reaction. Up to about 50 percent by weight of these unsaturated monomers are especially suitable.

A suitable dithiol for use in the invention has the generic formula SH-R-SH wherein R contain up to 10 carbon atoms. Substituents on R can be those which do not interfere with the curing reaction of a polydiene and the polythiol. Thus, it may be seen that any suitable aromatic or aliphatic dithiol can be used for curing the polydiene. Specific examples of dithiols include 1, 10 decanedithiol, (decamethylene dimercaptan), pp-dimercaptoxylene (Bis 3 mercapto ethyl ether), ethylene dimercaptan, trimethylene dimercaptan, pentamethylene dimercaptan, Bis (2 mercaptoisopropyl) ether, and 1, 3 Dimercaptobenzene, U.S. Pat. Nos. 3,509,112 to Cameron and 3,522,312 to Reece disclose other suitable dithiols for curing reactions of the invention.

Of the peroxides which catalyze the reaction between the polydiene and the dithiol, the most suitable peroxides are the organic peroxides. Suitable organic peroxides are listed in U.S. Pat. No. 3,487,052 to Millen et al. Especially suitable peroxides are dicumyl-peroxide and ditert butyl peroxide.

With the inclusion of epoxides in the curing reaction of the polydiene, the desired improvements in the mechanical strength of the polydiene is obtained. The desired epoxide for this invention must be a polyepoxide, that is contain at least two epoxy groups.

Examples of operable diepoxides are found in U.S. Pat. No. 3,681,472 to Jamison. An especially suitable epoxide is Bisphenol-A-glycidyl ether.

An amine catalyst is suitable for the reaction of the epoxide with the polydiene. Examples of suitable amines are listed in the above referenced Jamison patent, or the above referenced Cameron patent. An especially suitable amine is tri-butyl amine.

Although many reaction mechanisms appear to be possible for the reactants involved herein, it appears most likely that the dithiol reacts with the polydiene, and, then, the polyepoxide reacts with the thiol to complete the curing reaction. However, it is not intended to limit the method to this particular mechanism. These two reactions can be carried out in one step or two. The polydiene, dithiol and polyepoxide together with the appropriate catalyst can be mixed together all at once, and heated at a temperature of 80°–100°C for about 50 to 84 hours. A suitable heating time is 72 hours. Alternatively, the polydiene, and dithiol with a catalyst can be mixed and heated from 60° to 80°C for about 15 to 30 hours. A suitable heating time is 24 hours. The product is very viscous. The completion of this first reaction can be calculated theoretically based on the half-life of the peroxide. The second step of the process is then carried out with the epoxide curing agent and a catalyst. The reaction makes the material solid and usually takes about 36 to 54 hours. A suitable curing time is 48 hours.

These materials, the polydiene, the dithiol, the peroxide, and the epoxide and the amine require certain amounts of reactants.

For every mole of diene monomer in the polymer, at least 2 moles of dithiol and one mole of epoxy compound are required to complete the curing reaction. It is only in this way that the polydiene will be completely cured. With regard to the dithiol, the peroxide catalyst is present in the range of 5 to 10 percent by weight with respect to the dithiol. The epoxide requires 1 to 10 percent of the amine catalyst based on the weight of the epoxide.

When considered on a weight of polydiene basis, a suitable amount of dithiol is 0.12 to 1.15; the amount of peroxide is 0.037 to 0.060; the amount of epoxide is 1.15; and the amount of amine is 0.030. The amounts by weight are an indication that the polydiene can contain suitable comonomers. The key factor is that the curing agent is related to the diene present in polymer.

The following examples are intended to illustrate without unduly limiting the invention.

EXAMPLES I–VII

Liquid polybutadiene having a molecular weight of 6000 is mixed with the appropriate curing agents and catalyst, and heated. The times of heating and materials added are listed in the table. When the heat temperatures are listed, a two-step heating process and addition of curing agents is carried out with the dithiol being added first.

Example I has omitted the epoxide and amine curing agent. Example II has omitted the amine curing agent. The other Examples show the improved mechanical strength due to the use of two curing agents.

Thus, the improved mechanical properties of the polydiene leads to better casting and molding properties. The low curing temperatures are suitable for use in making propellant compositions.

What is claimed as new and desired to be secured by Letters Patent of the United States is:

1. A method of curing a polydiene comprising:
   a. combining the polydiene with
      1. at least two moles of a polythiol per mole of the polydiene and 5 to 10 percent by weight of a peroxide catalyst based on the weight of the polythiol; and
      2. at least one mole of a polyepoxide per mole of the polydiene and 1 to 10 percent by weight of an amine catalyst based on the weight of the polyepoxide to form a mixture;
   b. heating the mixture to form a cured polydiene
      1. at a temperture of 80° to 100°C
      2. for a period of 50 to 84 hours; and
   c. recovering the cured polydiene.
2. The method of claim 1 wherein the curing method is a two step method for both the combining and the heating.
3. The method of claim 2, wherein;
   a. a first step of the two-step method is carried out at a temperature 60° to 80°C with the dithiol curing agent and the peroxide catalyst;
   b. and a second step of the two-step method is carried out at a temperature of 80° to 100°C with the epoxide curing agent and the amine catalyst.
4. The method of claim 1 wherein the polydiene is a liquid.
5. The method of claim 4 wherein the polydiene has a molecular weight of 1000 to 10,000.
6. The method of claim 5 wherein the curing method is two step method for both the combining and the heating.
7. The method of claim 6 wherein;
   a. a first step of the two-step method is carried out at a temperature 60° to 80°C with the dithiol curing agent and the peroxide catalyst;
   b. and a second step of the two-step method is carried out at a temperature of 80° to 100°C with the epoxide curing agent and the amine catalyst.
8. The method of claim 7 wherein the amount of dithiol is 0.12 to 1.15 by weight of the polydiene the amount of peroxide is 0.037 to 0.060 by weight of the polydiene the amount of epoxide is 1.5 by weight of the polydiene and the amount of amine is 0.030 by weight of the polydiene.
9. The method of claim 8 wherein the polydiene is

TABLE I

| | Components in parts by weight | | | | | Curing Conditions | | Mechanical Properties | |
|---|---|---|---|---|---|---|---|---|---|
| Example No. | Polybuta-diene | Dithiol | Dicumyl Peroxide | Epoxide | Tributyl Amine | Hours at 70°C | Hours at 95°C | Elongation % | Tensile Strength lbs/in² |
| I | 6000MW | 0.12 DDT | 0.037 | — | — | — | 72 | 280 | 37 |
| II | 6000MW | 1.15 DDT | 0.040 | 1.5 DER 332 | — | 24 | 48 | 50 | 90 |
| III | 6000MW | 1.15 DDT | 0.040 | 1.5 DER 332 | 0.030 | 24 | 48 | 310 | 80 |
| IV | 6000MW | 1.15 DDT | 0.040 | 1.5 DER 332 | 0.030 | — | 72 | 310 | 86 |
| V | 6000MW | 0.95 DMX | 0.040 | 1.5 DER 332 | 0.030 | 24 | 48 | 640 | 57 |
| VI | 6000MW | 0.95 DMX | 0.060 | 1.5 DER 332 | 0.030 | — | 72 | 135 | 114 |
| VII | 6000MW | 0.95 DMX | 0.060 | 1.5 DER 332 | 0.030 | 24 | 48 | 420 | 72 |

DDT — 1,10 decanedithiol
DMX — pp'-dimercaptoxylene
DER — Bisphenol-A-glycidyl ether Obviously many modifications and variations of the present invention are possible in the light of the above teachings. It is, therefore, to be understood, that within the scope of the appended claims, the invention may be practiced otherwise than as specifically described.

polybutadiene.
10. The method of claim 9 wherein the dithiol is decanedithiol or dimercaptoxylene, the peroxide is dicumyl peroxide, the epoxide is bisphenol A glycidyl ether and the amine is tributyl amine.

11. The method of claim 5, wherein the amount of dithiol is 0.12 to 1.15 parts by weight based on polydiene, the amount of peroxide is 0.030 to 0.070 parts by weight based on the polydiene, the amount of epoxide is 1.5 by weight based on the weight of the polydiene, and the amount of amine is 0.030 based on the weight of the polydiene.

12. The method claim 11 wherein the polydiene is polybutadiene.

13. The method of claim 12 wherein the dithiol is decanedithiol or dimercaptoxylene, the peroxide is dicumyl peroxide, the epoxide is bisphenol A glycidyl ether, and the amine is tri-butyl amine.

14. The method of claim 10 wherein
a. the first heating step is for a period of 15 to 30 hours; and
b. the second heating step is for a period of 36 to 54 hours.

* * * * *